(12) United States Patent
Tarabara et al.

(10) Patent No.: US 9,309,132 B2
(45) Date of Patent: Apr. 12, 2016

(54) WATER AND OIL SEPARATION SYSTEM

(75) Inventors: Volodymyr Tarabara, East Lansing, MI (US); Wenqian Shan, Vacaville, CA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 521 days.

(21) Appl. No.: 13/817,298

(22) PCT Filed: Aug. 8, 2011

(86) PCT No.: PCT/US2011/046884
§ 371 (c)(1),
(2), (4) Date: Feb. 15, 2013

(87) PCT Pub. No.: WO2012/024099
PCT Pub. Date: Feb. 23, 2012

(65) Prior Publication Data
US 2013/0146536 A1    Jun. 13, 2013

Related U.S. Application Data

(60) Provisional application No. 61/373,991, filed on Aug. 16, 2010.

(51) Int. Cl.
*C02F 1/40* (2006.01)
*C02F 1/38* (2006.01)
*C02F 1/44* (2006.01)
(Continued)

(52) U.S. Cl.
CPC .............. *C02F 1/40* (2013.01); *B01D 17/0217* (2013.01); *B01D 17/085* (2013.01); *B01D 63/06* (2013.01); *B01D 63/08* (2013.01); *B01D 63/16* (2013.01); *B01D 65/08* (2013.01); *B01D 69/02* (2013.01); *B01D 69/12* (2013.01); *B01D 71/024* (2013.01); *B01D 71/34* (2013.01); *B01D 71/36* (2013.01); *C02F 1/38* (2013.01); *C02F 1/444* (2013.01); *E21B 43/34* (2013.01); *B01D 2321/2033* (2013.01); *B01D 2325/36* (2013.01); *B01D 2325/38* (2013.01); *C02F 2101/32* (2013.01)

(58) Field of Classification Search
CPC .............. C02F 1/40; C02F 1/38; C02F 1/444; C02F 2101/32; B01D 17/0217; B01D 63/06; B01D 63/16; B01D 69/12; B01D 71/024; B01D 71/34; B01D 71/36; B01D 2325/36; B01D 2325/38; E21B 43/34
See application file for complete search history.

(56) References Cited

U.S. PATENT DOCUMENTS 3,489,680 A * 1/1970 Snavely, Jr. ................. 210/512.1
4,876,013 A 10/1989 Schmidt et al.
(Continued)

FOREIGN PATENT DOCUMENTS

WO    WO9000922    2/1990

OTHER PUBLICATIONS

Chapter I International Preiliminary Report on Patentability for PCT/US2011/046884, dated Feb. 19, 2013.*

*Primary Examiner* — David A Reifsnyder
(74) *Attorney, Agent, or Firm* — Harness, Dickey & Pierce, P.L.C.

(57) ABSTRACT

A separation system includes at least a hydrocyclone and one or more membranes. In another aspect, a separation system includes a membrane having graduated and/or asymmetrical pore sizes. A further aspect of a separation system includes an inner membrane, an outer membrane and a hydrocyclonic flow between the membranes.

34 Claims, 5 Drawing Sheets

(51) Int. Cl.

| | |
|---|---|
| *B01D 17/02* | (2006.01) |
| *B01D 63/06* | (2006.01) |
| *B01D 63/16* | (2006.01) |
| *B01D 69/12* | (2006.01) |
| *B01D 71/02* | (2006.01) |
| *B01D 71/34* | (2006.01) |
| *B01D 71/36* | (2006.01) |
| *E21B 43/34* | (2006.01) |
| *B01D 17/00* | (2006.01) |
| *B01D 63/08* | (2006.01) |
| *B01D 65/08* | (2006.01) |
| *B01D 69/02* | (2006.01) |
| *C02F 101/32* | (2006.01) |

(56) References Cited

U.S. PATENT DOCUMENTS

| | | |
|---|---|---|
| 5,000,848 A | 3/1991 | Hodgins et al. |
| 2002/0189807 A1 | 12/2002 | Emanuele et al. |
| 2006/0041216 A1 | 2/2006 | McLaughlin et al. |

* cited by examiner

WATER AND OIL SEPARATION SYSTEM

CROSS-REFERENCE TO RELATED APPLICATION

This application is a National Phase Entry of International Application Serial No. PCT/US2011/046884, filed on Aug. 8, 2011, which claims the benefit of U.S. Provisional Application Ser. No. 61/373,991, filed on Aug. 16, 2010 both of which are incorporated by reference herein.

STATEMENT OF GOVERNMENT RIGHTS

This invention was made with government support under OISE-0530174 awarded by the National Science Foundation. The government has certain rights in the invention.

BACKGROUND AND SUMMARY

The present disclosure relates generally to liquid-liquid separation and more particularly to an oil and water separation system using a membrane.

Separation of oil from water has been a longstanding concern. Various devices have been tried but often with mediocre results. Hydrocyclones are generally known but none which circulate the oil/water mixture between membranes or which utilize various advantageous membrane characteristics. Exemplary conventional devices are disclosed in the following: U.S. Pat. No. 7,569,671 entitled "Method and System for Corn Fractionation" which issued to Cheryan on Aug. 4, 2009; U.S. Pat. No. 6,210,575 entitled "Crossflow Filter Cyclone Apparatus" which issued to Chase et al on Apr. 3, 2001; and U.S. Patent Publication No. 2002/0189807 entitled "Method and System for Oil and Water Separation Utilizing a Hydrostatic Pressure Head for Disposal of Water;" all of which are incorporated by reference herein.

In accordance with the present invention, a separation system includes at least a hydrocyclone and one or more membranes. In another aspect, a separation system includes one or more asymmetric membranes (i.e. membranes with a spatial gradient of pore size). A further aspect of a separation system includes an inner membrane, an outer membrane and a hydrocyclonic flow of the feed between the membranes. In yet another aspect of a separation system, separated oil and/or hydrocarbon is removed from adjacent a bottom or tail end of a lumen of a porous hollow fiber or a ceramic membrane. A method of separating oil from water in a mixture is also provided.

The present separation system is advantageous over conventional devices in that the present system is expected to more efficiently and completely perform separation, reduce fouling, and be more cost effective in use. The present system advantageously benefits from a synergistic combination of a hydrocyclone with multiple membranes and/or specific membrane characteristics to simultaneously separate oil-in-water dispersions into oil and water phases. Additional advantages and features of the present invention will become apparent from the following description and appended claims, taken in conjunction with the accompanying drawings.

DETAILED DESCRIPTION

Figure 1:
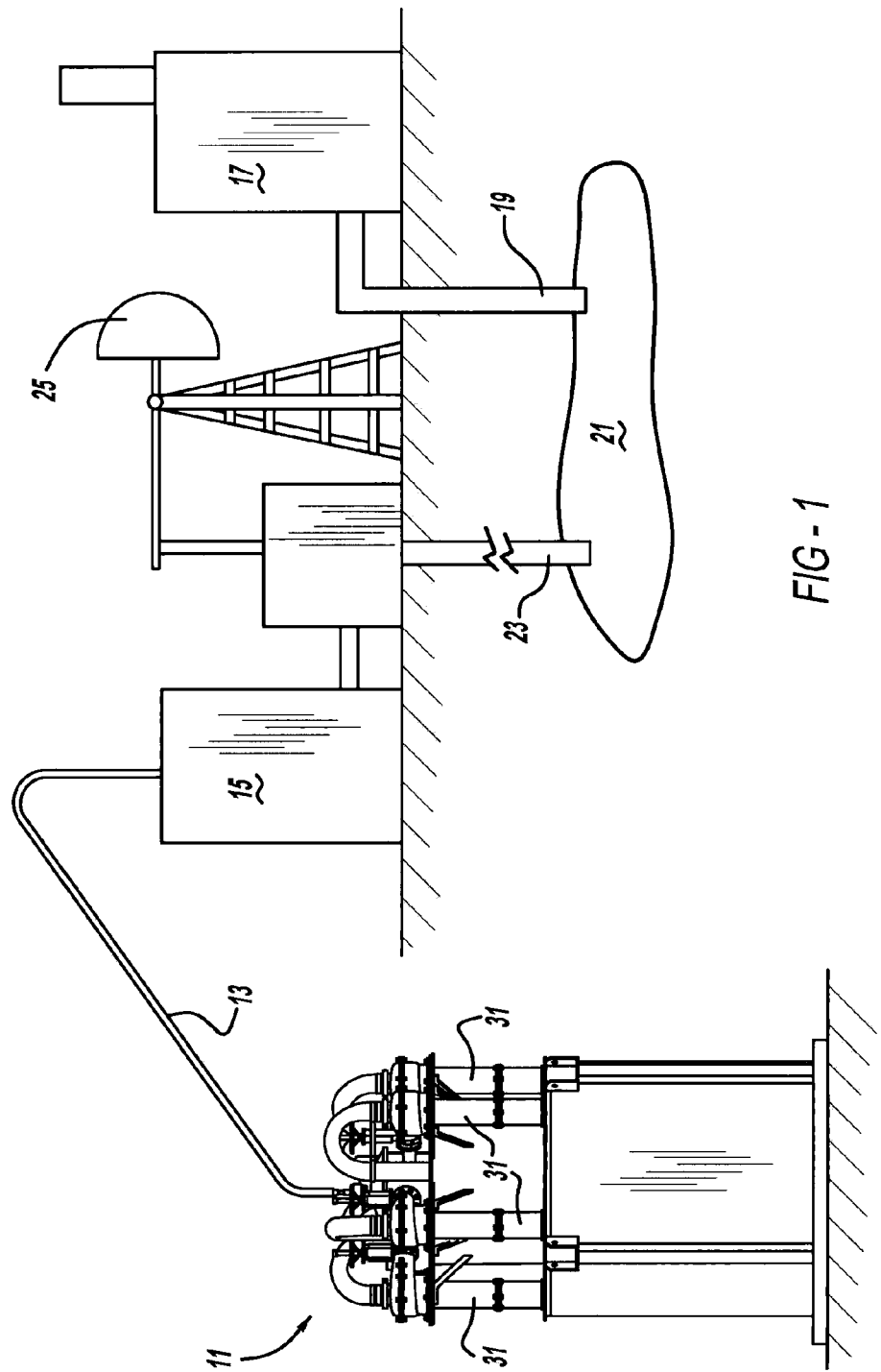
FIG. 1 is a perspective and partially diagrammatic view showing a production embodiment of the present separation system.
Figure 2:
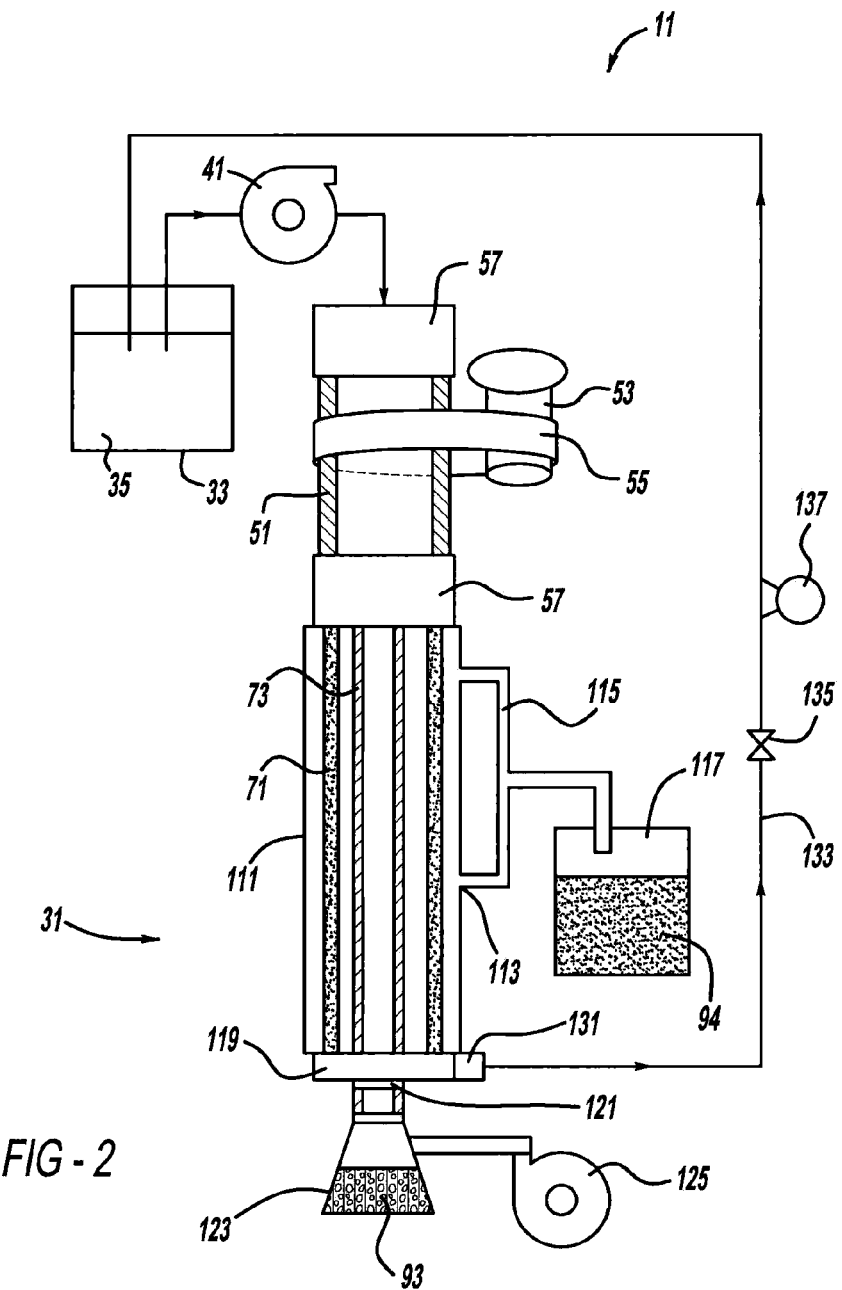
FIG. 2 is a diagrammatic view showing the production embodiment of the present separation system.
Figure 3:
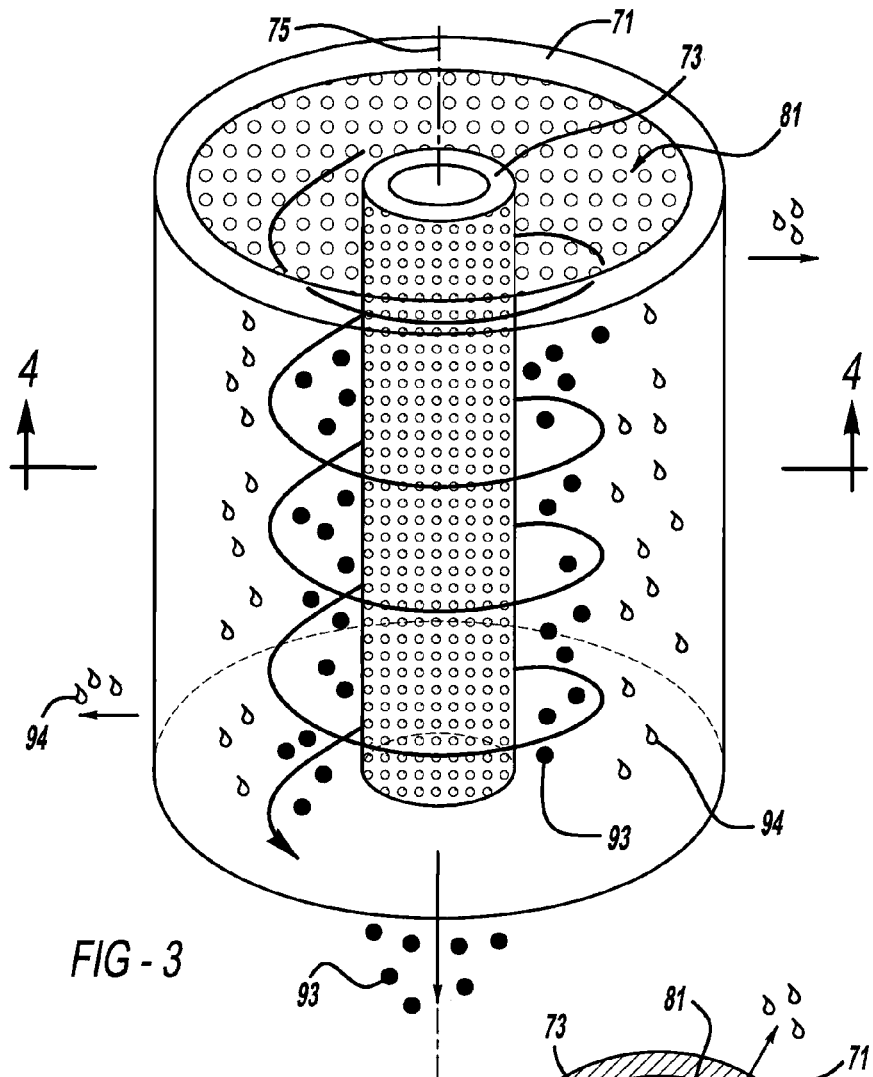
FIG. 3 is a diagrammatic perspective view showing the production embodiment of the present separation system.

A water and oil separation and purification system 11 preferably includes two tubular, concentrical membranes with opposite affinities to water (one hydrophilic and another hydrophobic or superhydrophobic) and a hydrocyclonic flow between the membranes. In the application shown in FIG. 1, separation system 11 is fed an oil and water mixture by way of a feed pipe 13 connected to a storage tank 15. A boiler 17 creates steam which is injected underground through an insulated tube 19 to loosen up tar sands or other heavy hydrocarbon or oil deposits 21. The steam/water and oil mixture are then pumped up the same or a different tube 23 by an oil well pump 25 and transported to storage tank 15. In another application, separation system 11 is mounted to a watercraft (not shown) such as a boat equipped with oil skimmers, off-shore oil platform, or other flotation device, which includes an inlet for receiving an oil-and-water mixture resulted from an oil spill into sea water or generated during oil production; the system also includes a storage tank and pipe for feeding the separation system. For both of these end uses, a coarse screen-type filter may be desired to remove sand and other suspended solid particles prior to entry of the liquid mixture to the present separation system.

The arrangement of FIG. 1 shows six parallel and vertically elongated separation columns 31 which are all fed by pipe 13 in a generally simultaneous and parallel processing manner. A greater or lower number of separation columns 31 can be employed depending upon the volume of the fed mixture, the quality of the purified constituents desired and the flow speed desired. Alternatively, an array of smaller (down to 10 mm in diameter and approximately 25 mm in length) separation columns can be mounted in a generally horizontal configuration outwardly radiating from a support tower (not shown).

FIGS. 2 through 5 illustrate a preferred production configuration for the present separation system 11. A feed tank 33 holds a mixture 35 of a hydrocarbon, such as oil, and water. A Moyno® pump 41 feeds the mixture from the feed tank to an inlet of a leading end of separation column 31.

Mixture 35 is initially fed into a fluid rotation-inducing cylinder 51 which is rotated by an electric motor 53 and an inter-connecting belt drive transmission 55. Alternatively, a reducing gear, sprocket and chain, or other mechanical or electromagnetic transmission can be employed to rotate cylinder 51. Cylinder 51 is a hollow metal tube, of a cylindrical shape, which is journaled within a stationary housing or support frame (not shown) by way of two bearing and swivel assemblies 57. Seals and an end cap are provided. The inside surface of cylinder 51 may be provided with a coarse texture, splines, vanes, or other pattern to impart a hydrocyclonic and rotational swirling motion to the mixture in and downstream of the cylinder. Alternatively, a rotational impeller can be used within the fluid path instead of the cylinder to provide a diagonal or other off-axis feeding of the mixture into separation column 31 in order to cause the hydrocyclone movement of mixture 35 therein. Alternatively, swirling motion can be imparted to the feed by introducing it through an inlet located under an angle with respect to the centerline axis 75 of the separation column 31.

Separation column 31 further includes an outer membrane 71 and a concentric inner membrane 73, both of which are coaxial with a centerline axis 75 of separation column 31. Furthermore, a set of brackets may retain ends of the rigid membranes within a housing. Inner membrane 73 is either a porous hollow fiber membrane or a ceramic membrane or a metallic membrane, with an exterior surface 83 thereof coated with hydrophobic (e.g., PTFE (Teflon) or PVDF (polyvinylidene fluoride)) or superhydrophobic layer 77. Outer membrane is a hydrophilic ceramic (e.g., $TiO_2$, $SiO_2$/$Al_2O_3$) membrane, which can be coated with a layer 79 of different ceramic material (e.g., $Fe_2O_3$) on an interior surface 101. The ceramic material is made by sintering and compression of its constituent materials. An exemplary ceramic membrane construction is disclosed in U.S. Pat. No. 5,266,207 entitled "Composite Nanofiltration Membrane" which issued to Boye et al. on Nov. 30, 1993, and is incorporated by reference herein.

Figure 4:
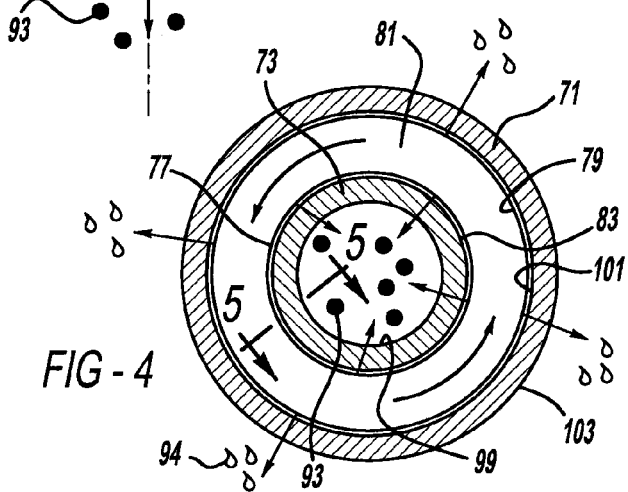
FIG. 4 is a cross-sectional view, taken along line 4-4 of FIG. 3, showing the production embodiment of the present separation system.
Figure 5:
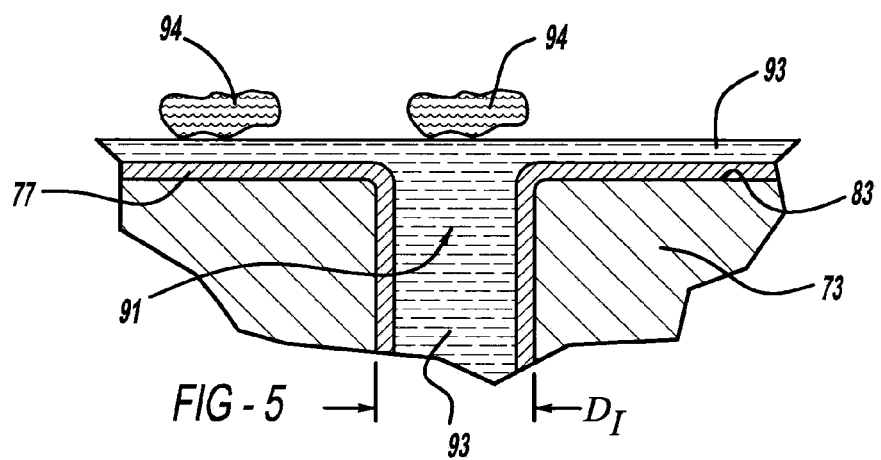
FIG. 5 is an exaggerated sectional view, taken along line 5-5 of FIG. 4, showing the production embodiment of the present separation system.
Figure 6:
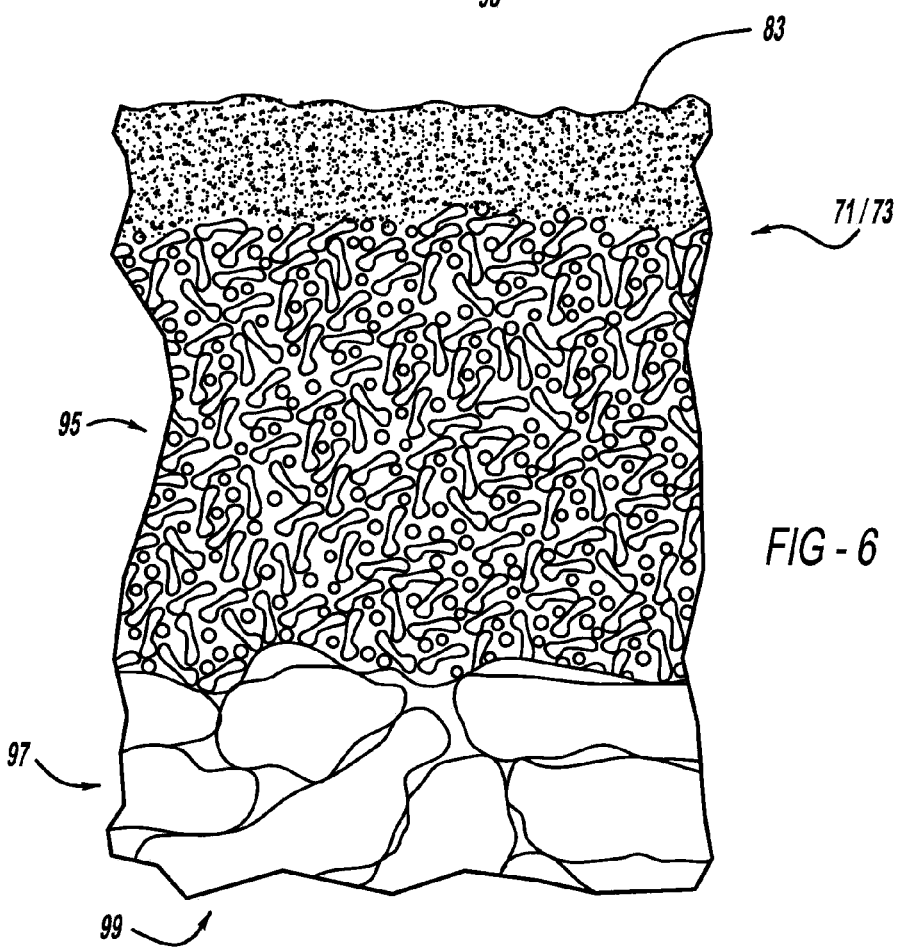
FIG. 6 is an enlarged sectional view, taken along line 5-5 of FIG. 4, showing the production embodiment of the present separation system.

Referring to FIGS. 4-6, when made of ceramic material, membranes 71 and 73 each have a graduated and asymmetrical pore size arrangement with the smallest size being closest to a gap 81 between the membranes where mixture 35 is swirling. For example, exterior surface 83 of inner membrane 73 is most dense with an average pore diameter $D_I$ of approximately 1-10 microns or otherwise suitable to allow oil droplets 93 or oil from continuous film covering surface 83 to pass therethrough and to encourage wetting of the membrane/layer surface and covering of the pores 91 due to the affinity of oil 93 to the oleophilic and hydrophobic coating 77 thereon. The pore size and spacing is more open in an intermediate portion 95 behind surface 83 and are much more open in the larger support portion 97 adjacent an interior surface 99 defining the central and hollow lumen or passageway through the inner membrane. Outer membrane 71 is similarly constructed but in mirrored symmetry with its interior surface 101 being denser than its exterior surface 103. Similarly but in reverse, coating 79 on interior surface 101 of the outer membrane is hydrophilic and oleophobic, with its smallest average pore diameter $D_o$ being less than 20 microns, preferably no greater than 1 micron. The graduated and asymmetric pores are inter-connected between the different density portions; such connectedness advantageously reduces fouling or plugging of pores by contaminants, especially as compared to a membrane having unconnected pores throughout its cross-sectional thickness.

With the (super)hydrophobic/olephilic membrane forming the inner wall and the hydrophilic membrane forming the outer wall of the flow channel, the rotating flow results in a centripetal force acting on oil droplets bringing them closer to the (super)hydrophobic/olephilic inner membrane (sink for oil) and away from the hydrophilic outer membrane (sink for water) thereby alleviating the fouling of the hydrophilic membrane by oil. At the same time, the water with lower oil concentration will be found in the vicinity of the interior surface of the outer hydrophilic membrane. The present system employs a cross-flow filtration hydrocyclone process since rotating flow is used. A notable difference as compared to conventional devices, however, is that instead of removing oil with a flow core, the oil is collected into the (super) hydrophobic/olephilic tubular membrane positioned near the centerline of the present system.

Returning to FIG. 2, a collecting tank or holder 111 concentrically surrounds outer membrane 73 with a small space therebetween. This allows for the transmission of water droplets through the pores in outer membrane for collection and removal by a fluid flow system including at least one outlet 113 and associated pipe 115 to a purified water receptacle 117. Collecting tank 111 is capped at its tail end or bottom by a sealed cap 119. Furthermore, an outlet 121 is connected to the tail end or bottom of the lumen or internal passageway within inner membrane 73 so as to allow the removal of the purified oil into an oil receptacle 123 connected thereto via a fluid flow system. A vacuum pump 125 is connected to outlet 121 to provide a pressure drop which assists in flowing the oil otherwise gathered within inner membrane 73. Moreover, an outlet 131 is connected to the tail or bottom end of gap 81 between the inner and outer membranes 73 and 71, respectively. Outlet 131 allows for removal of the concentrate flow that is remaining oil and water mixture 35 which did not flow through and get filtered by the pores of either membrane. The concentrate travels from outlet 131 to a fluid flow plumbing system 133 which includes a back pressure regulator 135, a pressure gauge 137, and optionally a pump (not shown), for either transmission back into feed tank 33 or to a downstream and subsequent dual affinity and hydrocyclone separation system such as a duplicate of that disclosed herein.

Figure 7:
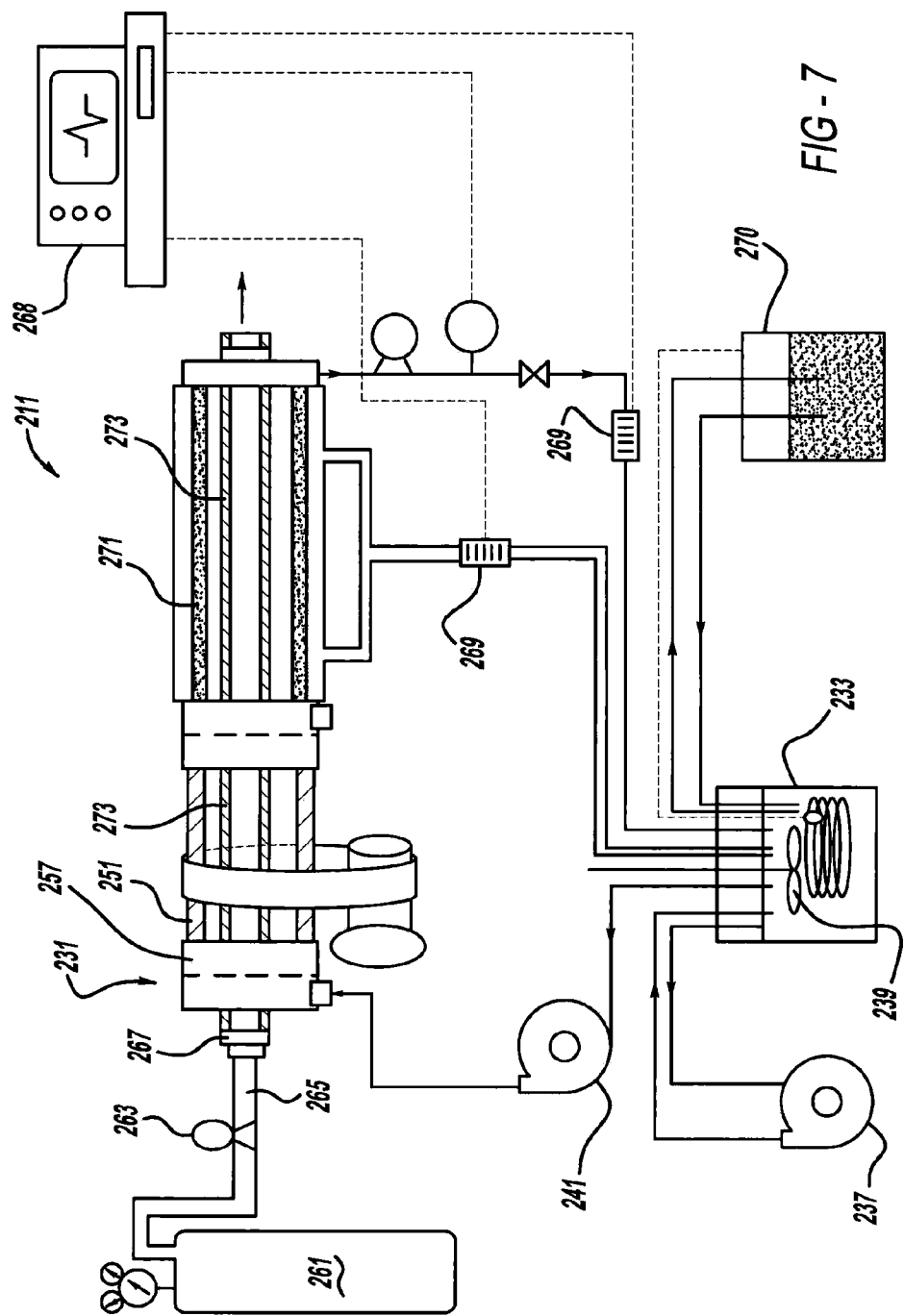
FIG. 7 is a diagrammatic view showing a laboratory embodiment of the present separation system.

FIG. 7 shows a preferred laboratory configuration for the present separation system 211. Separation system 211 contains a separation column 231 similar to the production configuration, however, an inner membrane 273 is elongated past the axial length of an outer membrane 271 such that a leading end of inner membrane 273 additionally extends into and through a rotating cylinder 251. Thus, a swivel 257 is sealed to allow cylinder 251 to rotate about the stationary and centrally located inner membrane 273 therein. A gas vessel 261 provides pressurized air through a pipe 265, monitored by a pressure gauge 263, to a connector inlet 267 in communication with a leading end of inner membrane 273. This provides air to a lumen or central passageway of inner membrane 273 to assist in pushing out oil which has passed through its pores and is otherwise collecting within the lumen of the inner membrane. This is especially beneficial when the inner and outer membranes are horizontally oriented as is shown for this configuration. The present laboratory configuration additionally includes a data acquisition system using a programmable computer controller 268, flow meters 269, and a circulating chiller assembly 270. The diluted mixture and purified water are transmitted back into a feed tank 233 for experimental purposes while chiller is used to reduce experimental variables. Moreover, Moyno® and diaphragm pumps 241 and 237, respectively, and a feed tank impeller 239 are also utilized.

Referring to both the production and laboratory embodiments, the present separation system advantageously combines centripetal and gravitational forces of a hydrocyclone simultaneously in time and proximity with cross-flow filtering through the two membranes of opposite affinities. The use of the hydrocyclonic flow between most of and more preferably the entire longitudinal porous length of the inner and outer membranes maximizes these beneficial synergies. The synergistic advantages of the combined hydrocyclone oil and water separation with the membrane core construction and affinity/repellant nature of the membranes and/or their coatings, should provide superior performance as compared to a conventional hydrocyclone by itself and the use of a conventional membrane by itself.

While various embodiments have been disclosed, it should be appreciated that the separation system of the present disclosure may be additional altered. For example, it is envisioned that the combined hydrocyclone and outer membrane of the various constructions disclosed herein may be employed without requiring the use of an inner membrane, however, various beneficial advantages of the present system may not be achieved. Furthermore, asymmetrical membranes may be constructed with a hydrocyclone in different system configurations than that described herein, such as only with a single inner or outer membrane, although various advantages may not be realized. Alternatively, one or both of the membranes may have a frustoconical shape, however, the manufacturing and cost advantages may not be achieved. While various dimensions, materials and plumbing systems have been disclosed, it should be appreciated that alternatives may be employed although this may forego certain advantages of the presently preferred system. It is intended by the following claims to cover these and any other departures from the disclosed embodiments which fall within the true spirit of this invention.

The invention claimed is:

1. A separation system comprising:
 a tubular outer membrane including pores;
 a tubular inner membrane including pores, the inner membrane being located inside the outer membrane with a gap between the inner and outer membranes; and
 a liquid-rotation-inducing member causing liquid rotation prior to contact against the inner membrane;
 wherein the tubular outer membrane is hydrophilic and the tubular inner membrane is hydrophobic; and
 wherein the inner and outer membranes and liquid-rotation-inducing member operably cause hydrocyclonic and filtering separation.

2. The separation system of claim 1, further comprising oil being separated from water by the liquid rotation of an oil and water mixture between the inner and outer membranes, at least some of the oil passing through the inner membrane and at least some of the water passing through the outer membrane, and the liquid-rotation-inducing member is at least one of: (a) a rotating cylinder upstream of the membranes, (b) rotating vanes, (c) a rotating impeller, and (d) an offset angled inlet.

3. The separation system of claim 1, wherein the inner membrane deters water from passing therethrough and the outer membrane deters oil from passing therethrough, further comprising brackets retaining ends of the inner and outer membranes within a housing.

4. The separation system of claim 1, further comprising a hydrophilic and oleophobic coating located on an interior surface of the outer membrane, and gas pressure assisting in removing an oil after it passes through the pores of the inner membrane.

5. The separation system of claim 1, further comprising an $Fe_2O_3$ coating on one of the inner and outer membranes.

6. The separation system of claim 1, further comprising an oleophilic and hydrophobic or superhydrophobic coating located on an exterior surface of the inner membrane.

7. The separation system of claim 1, further comprising a coating including at least one of: polytetrafluoroethylene (PTFE) and polyvinylidine difluoride (PVDF), located on one of the inner and outer membranes.

8. The separation system of claim 1, wherein at least one of the inner and outer membranes includes a rigid, ceramic material.

9. The separation system of claim 1, wherein at least one of the inner and outer membranes includes a sintered and compressed material.

10. The separation system of claim 1, wherein each of the inner and outer membranes is cylindrical and rigid.

11. The separation system of claim 1, further comprising:
 a tank substantially surrounding a porous exterior of the outer membrane;
 a first outlet located adjacent a bottom of the tank allowing removal of separated water from between the outer membrane and the tank;
 a second outlet located adjacent a bottom of a central passageway in the inner membrane removing separated oil from within the passageway; and
 a third outlet removing any oil/water mixture remaining adjacent a bottom of the gap between the inner and outer membranes.

12. The separation system of claim 1, further comprising at least one tube supplying steam to an underground oil deposit and extracting a mixture therefrom, the extracted mixture being separated by the inner and outer membranes.

13. The separation system of claim 1, wherein the inner and outer membranes separate a mixture which includes seawater and oil.

14. A separation system comprising:
 a fluid passageway;
 a first membrane including pores of substantially graduated sizes with the smallest size pores being closest to the passageway;
 at least a second membrane; and
 a mixture of water and hydrocarbon flowing into the fluid passageway in a hydrocyclonic motion to encourage centripetal migration of the hydrocarbon with respect to the water;
 the pores of the first membrane allowing one of the water and the hydrocarbon to pass through the membrane while deterring the other of the water and the hydrocarbon from passing through the membrane; and
 the hydrocyclonic motion and first membrane pores separating at least some of the water and the hydrocarbon,
 wherein the first membrane is hydrophilic and the second membrane is hydrophobic.

15. The separation system of claim 14, wherein:
 the at least second membrane is an inner membrane coaxially located within the first membrane, the inner membrane has a central fluid passageway therein, and the inner membrane includes pores;
 the first membrane includes the fluid passageway in a hollow middle thereof;
 the hydrocarbon passes through the pores of the inner membrane while the inner membrane deters the water from passing therethrough; and
 the water passes through the pores of the first membrane while the first membrane deters the hydrocarbon from passing therethrough.

16. The separation system of claim 15, wherein the first and second membranes have substantially the same elongated length, and the hydrocyclonic motion of the mixture is between the first and second membranes along a majority length of both of the first and second membranes.

17. The separation system of claim 14, wherein the hydrocarbon is oil, further comprising a hydrophilic and oleophobic layer located on an interior surface of the first membrane.

18. The separation system of claim 14, wherein the first and second membranes include a rigid, ceramic material.

19. The separation system of claim 14, wherein each of the first and second membranes is cylindrical, further comprising brackets retaining ends of the first and second membranes within a housing.

20. The separation system of claim 14, wherein at least one of the first and second membranes is tubular and in a center of the hydrocyclonic motion of the mixture, and the hydrocyclonic motion reduces fouling of the hydrophilic membrane by the hydrocarbon.

21. A separation system comprising:
a hollow first membrane;
a hollow second membrane, the second membrane being located concentrically inside the first membrane with a gap between the first and second membranes; and
a first liquid at least partially separated from a second liquid by hydrocyclonic movement of the first and second liquids within the gap between the first and second membranes, at least some of the second liquid passing through the second membrane and at least some of the first liquid passing through the first membrane, in both situations the passing through occurring adjacent a majority of an axial length of the first and second membranes;
a layer located on a surface of the first membrane having an affinity for the first liquid;
a layer located on a surface of the second membrane having an affinity for the second liquid;
the first membrane deterring the second liquid from passing therethrough and the second membrane deterring the first liquid from passing therethrough;
a collector substantially surrounding the first membrane to collect the first liquid which passes therethrough;
a first outlet connected to the collector removing the separated first liquid from between the first membrane and the collector; and
at least a second outlet connected to the second membrane removing the separated second liquid from within the second membrane;
wherein at least one of the first and second membranes includes a rigid, ceramic material.

22. The separation system of claim 21, further comprising pores of each of the first and second membranes being of a graduated cross-sectional size, and one of the first and second liquids including oil and the other of the first and second liquids including water.

23. The separation system of claim 21, further comprising a hydrocyclonic generator causing the hydrocyclonic movement which reduces fouling of a hydrophilic one of the first and second membranes by one of the liquids which is oil.

24. The separation system of claim 21, wherein each of the first and second membranes is circular-cylindrical and rigid.

25. The separation system of claim 21, wherein trailing ends of the first and second membranes are adjacent each other, but separated by the gap between the first and second membranes, and rotation of the liquids between the first and second membranes begins prior to contact of the liquids against the first and second membranes.

26. A separation system comprising:
a hydrocyclonic generator causing a mixture of oil and water to rotationally swirl as a hydrocyclonically swirling mixture about an axis through a center of the hydrocyclonically swirling mixture;
a porous and rigid inner membrane located adjacent a center of the swirling mixture, substantially coaxial with the axis;
an inlet for the mixture being located adjacent a leading end of the inner membrane;
an outlet located adjacent an opposite trailing end of the inner membrane for removing a filtered one of the oil and water from inside of the inner membrane,
the inner membrane extending along a length of the hydrocyclonically swirling mixture; and
an outer rigid membrane surrounding the hydrocyclonically swirling mixture such that the hydrocyclonically swirling mixture swirls between the porous and rigid inner membrane and the outer rigid membrane, and the outer rigid membrane is coaxial with the centerline, the inner membrane being hydrophobic and the outer membrane being hydrophilic.

27. The separation system of claim 26, wherein the porous and rigid inner membrane is ceramic with asymmetrical pore sizes graduating from smaller size pores near an external surface thereof to larger size pores closest to the axis.

28. The separation system of claim 26, wherein the oil is removed from inside of the porous and rigid inner membrane adjacent an end thereof substantially opposite the hydrocyclonic generator.

29. A method of separating oil from water in an oil/water mixture, the method comprising:
(a) creating a hydrocyclonic flow of the mixture between a rigid inner membrane and a rigid outer membrane;
(b) using the hydrocyclonic flow to encourage separation of the oil and water;
(c) flowing the oil through the inner membrane substantially temporally and locationally simultaneously with step (b); and
(d) flowing the water through the outer membrane substantially simultaneously temporally and locationally with steps (b) and (c).

30. The method of claim 29, further comprising encouraging flow through of one of the oil and water while discouraging flow through of the other of the oil and water by use of a material layer located on at least one of the inner and outer membranes, and causing rotation of the mixture prior to flowing the mixture between the inner and outer membranes.

31. The method of claim 29, further comprising using ceramic material for the inner and outer membranes.

32. The method of claim 29, further comprising flowing separated oil from adjacent a bottom of the inner membrane.

33. The method of claim 29, further comprising separating the oil from water after the oil is pumped from an underground oil field.

34. The method of claim 29, further comprising separating the oil from water after the oil has spilled into seawater.

* * * * *